United States Patent
Guy

[15] 3,690,393
[45] Sept. 12, 1972

[54] MAGNETIC WHEEL
[72] Inventor: William K. Guy, Sunrise Golf Village, Fla.
[73] Assignee: Donna Kramer, Plantation, Fla.
[22] Filed: March 19, 1971
[21] Appl. No.: 125,929

[52] U.S. Cl. ..........................180/1, 46/230, 105/77, 180/65, 301/41
[51] Int. Cl..........................B60b 39/00, B60l 11/00
[58] Field of Search..........180/1 VS, 1, 2, 54, 65, 60; 105/77, 78; 46/230, 234, 235; 301/5, 41

[56] References Cited
UNITED STATES PATENTS
2,838,009    6/1958    Bonanno.....................105/77

FOREIGN PATENTS OR APPLICATIONS
978,600    12/1964    Great Britain...........180/1 VS Primary Examiner—A. Harry Levy
Attorney—Clarence A. O'Brien and Harvey B. Jacobson

[57] ABSTRACT

A magnetic wheel having axial end faces oppositely polarized magnetically, is maintained thereby in rolling contact with a magnetic flux conducting path. The wheel when driven propels a vehicle frame along the path without reliance on traction. Rolling contact is maintained by the magnetic field established by the flux extending between the end faces through the surface of the path producing contact holding forces acting on the non-polarized rim of the wheel.

12 Claims, 11 Drawing Figures

PATENTED SEP 12 1972 3,690,393
SHEET 1 OF 2
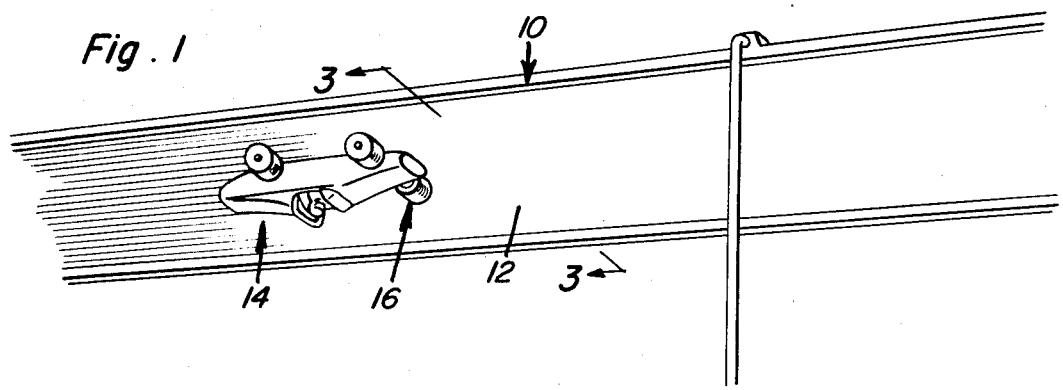
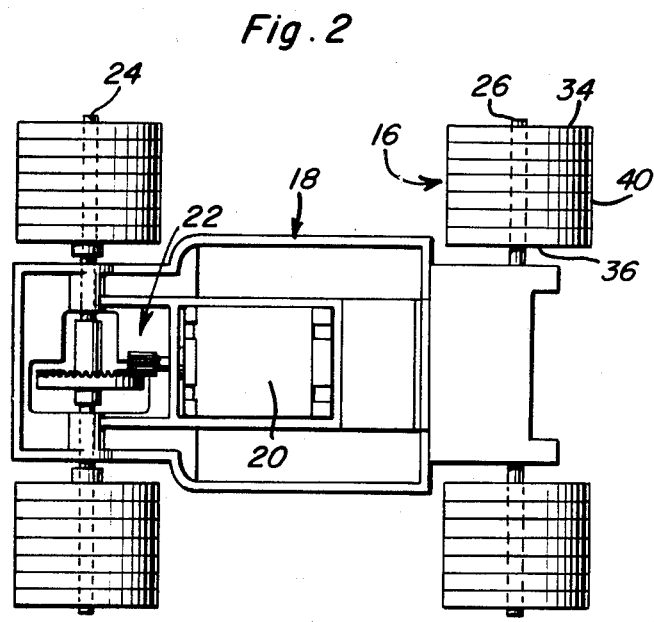
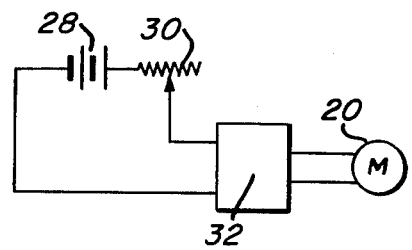
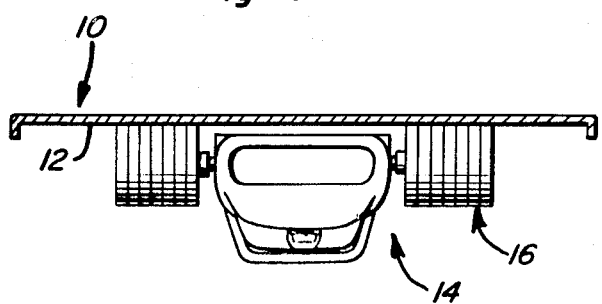
William K. Guy
INVENTOR.
BY Clarence A. O'Brien
and Harvey B. Jacobson
Attorney

PATENTED SEP 12 1972

William K. Guy

INVENTOR.

BY Clarence A. O'Brien
and Harvey B. Jacobson
Attorneys

MAGNETIC WHEEL

This invention relates to a new and useful mode of transportation involving magnetic wheels and a cooperating path having a magnetic flux conducting surface.

Wheeled vehicle transportation along roadway surfaces is presently limited by gravitational and frictional forces that are affected by the speed and loading of the vehicle because of its reliance on roadway traction for propulsion. Further, there is a problem with surface wear of the wheels supporting the vehicles.

It is an object of the present invention to provide wheeled support for a vehicle relative to a roadway surface or the like forming a path along which the vehicle may be propelled without reliance on any traction. In this way, the drag effect of friction and gravity, and wear of the wheels is eliminated.

In accordance with the present invention, a vehicle frame is supported on the axles of magnetic wheel assemblies which are in rolling contact with a roadway surface having a magnetic flux conducting property. Each wheel assembly has opposite axial end faces that are oppositely polarized magnetically thereby establishing magnetic fields that extend between the end faces through the flux conducting surface of the roadway path. The strength of the magnetic field is sufficient to maintain the wheel assembly in rolling contact along the non-polarized rim of the wheel between the end faces. The strength of the magnetic field is regulated or selected so as to maintain rolling contact regardless of the loading on the wheel axles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view showing a typical installation for the present invention;

FIG. 2 is a plan view of a typical vehicle assembly utilizing magnetic wheels in accordance with the present invention;

FIG. 3 is a front sectional view taken substantially through a plane indicated by section line 3—3 in FIG. 1;

FIG. 4 is a simplified electrical circuit diagram associated with the vehicle shown in FIGS. 1, 2 and 3;

Figure 5:
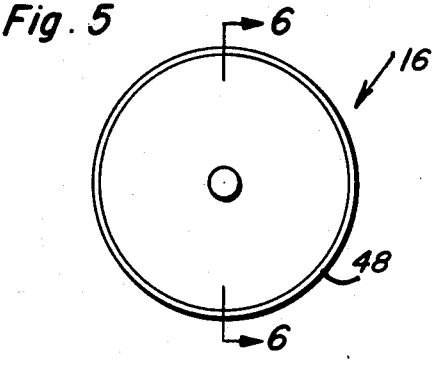
FIG. 5 is an enlarged side elevational view of one of the magnetic wheel assemblies shown in FIGS. 1, 2 and 3.

Referring now to the drawings in detail, FIGS. 1 and 3 illustrate by way of example a roadway generally referred to by reference numeral 10 having a magnetic flux conducting surface 12 extending along a predetermined path. In the illustrated embodiment, the surface 12 is inverted with respect to the surface of the earth. Accordingly, a vehicle generally referred to by reference numeral 14 may be propelled along the surface 12 without reliance on gravity to produce traction between the wheel assemblies 16 and the surface 12. The vehicle is positioned in spaced relation to the roadway surface 12 which is shown inverted in FIGS. 1 and 3 merely to emphasize that vehicle propulsion is in no way dependent upon gravitationally produced traction as in the case of conventional land surface vehicles.

In the illustrated embodiment as more particularly shown in FIG. 2, the vehicle includes a suitable frame 18 on which a prime mover is mounted such as a reversable electric motor 20. The output shaft of the motor 20 is drivingly connected by suitable gearing 22 to a live axle 24 to which a pair of wheel assemblies 16 are secured in order to propel the vehicle. Another pair of wheel assemblies 16 may be rotatably mounted about a second axle 26 fixed to the vehicle frame 18 in order to establish a rotational axis for the second pair of wheel assemblies. As diagrammatically shown in FIG. 4, the electric motor 20 may be connected to a suitable source of electrical energy 28 through a speed controlling rheostat control 30 and a motor reversing switch assembly 32. Accordingly, forward and reverse speed control may be exercised over the drive motor 20 in order to control propulsion of the vehicle.

Figure 11:
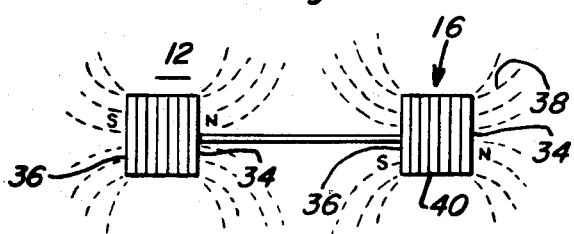
FIG. 11 is a simplified top plan view of a pair of magnetic wheel assemblies on a roadway surface.

As diagrammatically shown in FIG. 11, each of the wheel assemblies 16 is magnetic in that the axial end faces 34 and 36 are oppositely polarized. A magnetic field as denoted by the flux lines 38 in FIG. 11 therefore extends between the end pole faces 34 and 36 through the flux conducting surface 12. As a result of the forces produced by the magnetic field, the non-polarized circular rim 40 of each magnetic wheel assembly 16 is held in rolling contact with the surface 12. The strength of the magnetic field is such as to maintain rolling contact regardless of the load carried by the wheel assemblies through their axles. Further, the rim surface 40 of the wheel assemblies in contact with the flux conducting surface 12 are non-polarized so as to avoid any drag on the wheel assemblies as the vehicle frame is propelled. The magnetic flux is emitted only from the end faces 34 and 36. Thus, surface contact is maintained between each wheel assembly and the surface 12 substantially along a line parallel to the rotational axis of the wheel and the rim 40 provided with some type of non-magnetic anti-friction means.

Figure 6:
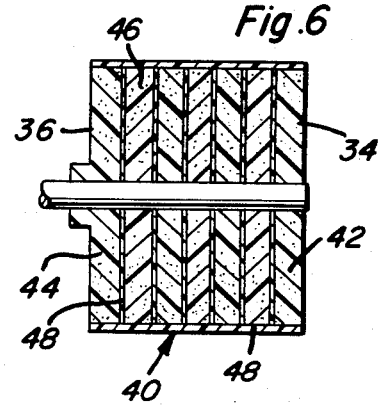
FIG. 6 is a sectional view taken substantially through a plane indicated by section line 6—6 in FIG. 5.

FIGS. 5 and 6 illustrate the details of the magnetic wheel assemblies 16 shown in FIGS. 1, 2 and 3. The end faces 34 and 36 are formed on opposite sides of the axially outer discs 42 and 44 which form part of a cylindrical body with a plurality of intermediate discs 46. The discs are secured to each other by adhesive 48 to form a laminate. Further, each of the discs is a permanent magnet with the opposite poles formed at the axial end faces. The peripheral surfaces of the discs are coated by a material such as Teflon 48 to form the non-polarized, anti-friction rim 40.

Figure 7:
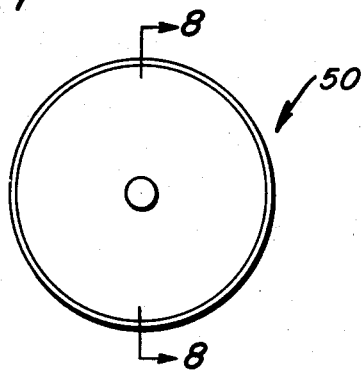
FIG. 7 is a side elevational view of a modified form of magnetic wheel.
Figure 8:
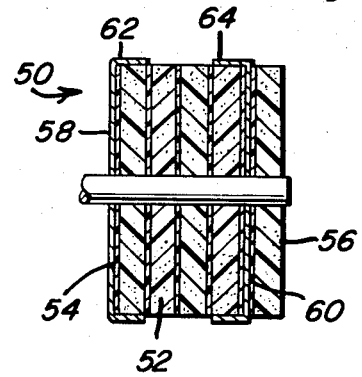
FIG. 8 is a sectional view taken substantially through a plane indicated by section line 8—8 in FIG. 7.

FIGS. 7 and 8 illustrate another form of magnetic wheel assembly 50 in which a plurality of axially stacked permanent magnet discs 52 form a laminated cylindrical body with oppositely polarized end faces 54 and 56. Metallic discs 58 and 60 are respectively positioned at the end of the cylindrical body and intermediate two of the discs 52. Annular flanges 62 and 64 on the discs 58 and 60 form non-polarized, surface contacting rims for the wheel assembly 50.

Figure 9:
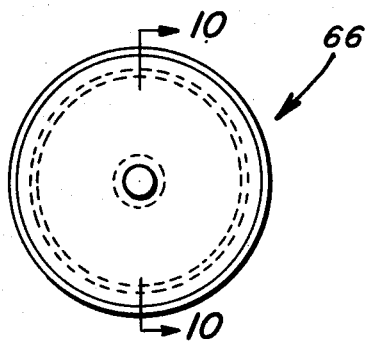
FIG. 9 is a front elevational view of still another modified form of magnetic wheel.
Figure 10:
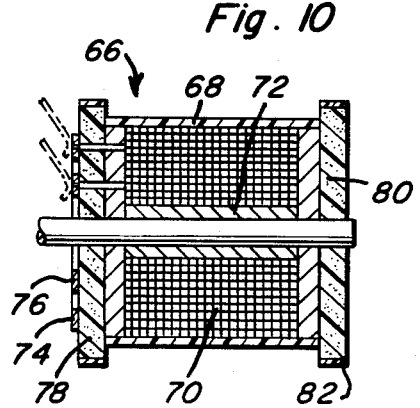
FIG. 10 is a sectional view taken substantially through a plane indicated by section line 10—10 in FIG. 9.

A third form of magnetic wheel assembly 66 is illustrated in FIGS. 9 and 10. The body of the wheel assembly 66 is formed by a non-magnetic cylindrical shell 68 enclosing an electromagnetic coil 70 about an inner core 72. Electrical energy may be supplied to the electro-magnetic coil through wiper contacts 74 and 76 secured to a magnetic pole disc 78 at one axial end opposite the end to which the pole disc 80 is secured. Upon energization of the electro-magnetic coil, the pole discs 78 and 80 will expose axial end faces of opposite magnetic polarity. The annular rims of the pole discs are coated with a non-magnetic, anti-friction material 82 for rolling contact with the magnetic flux conducting surface.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a surface having a magnetic flux conducting property, a vehicle frame, and at least one wheel assembly rotatably mounted by the frame about a rotational axis, said wheel assembly including a substantially cylindrical body having axial end faces of opposite magnetic polarity and a non-polarized rim extending axially between said end faces in operative relation to the surface.

2. The combination of claim 1 including anti-friction means on said rim for contact with the surface between the axial end faces along a line substantially parallel to the rotational axis.

3. The combination of claim 2 wherein said anti-friction means comprises a non-magnetic coating.

4. The combination of claim 3 wherein said cylindrical body is a permanent magnet.

5. The combination of claim 1 wherein said body is made from a plurality of axially laminated permanent magnets.

6. The combination of claim 5 including anti-friction means on said rim for contact with the surface between the axial end faces along a line substantially parallel to the rotational axis.

7. The combination of claim 1 wherein said body embeds electro-magnetic means for polarizing the axial end faces.

8. The combination of claim 1 including a source of motive energy mounted on the vehicle frame and means drivingly connecting said source to the wheel assembly for rotation thereof to propel the vehicle frame along the surface.

9. The combination of claim 1 wherein the end faces are magnetically polarized by an amount maintaining the rim in rolling contact with substantially no drag.

10. The combination of claim 9 wherein said body embeds electromagnetic means for polarizing the axial end faces.

11. The combination of claim 9 including a source of motive energy mounted on the vehicle frame and means drivingly connecting said source to the wheel assembly for rotation thereof to propel the vehicle frame along the surface.

12. The combination of claim 9 including anti-friction means on said rim for contact with the surface between the axial end faces along a line substantially parallel to the rotational axis.

* * * * *